INVENTORS
PHILIP W. HARLAND
RALPH D. WAITE
BY
ATTORNEYS

3,530,724
PLASTIC CASE WITH CONNECTION AND O-RING SEAL
Philip W. Harland, Perkasie, and Ralph D. Waite, Sellersville, Pa., assignors to Ametek, Inc., New York, N.Y., a corporation of Delaware
Filed Dec. 19, 1968, Ser. No. 785,261
Int. Cl. G01l 19/14
U.S. Cl. 73—431                                 3 Claims

ABSTRACT OF THE DISCLOSURE

An instrument casing assembly having a plastic back plate which has a central bore therethrough and a boss on the outer face of said back plate surrounding said bore. An instrument movement is mounted on one end of a metallic tubular socket which is closely received within the bore and has a plurality of annular serrations for gripping the inner face of the bore. The outer end of the socket projects outwardly beyond the boss and is surrounded with a resilient O-ring for effecting a sealing connection with a shoulder of a stepped bore of a housing.

---

Instruments for sensing, measuring or recording physical conditions such as temperature and pressure generally comprise an instrument movement responsive to conditions mounted within an instrument casing. The casing may have two sections comprising a cover and a back plate which are suitably connected together. The instrument movement is generally mounted within the casing on the back plate and communicates through a system of passages in the back plate to an outer connection. This outer connection is used for mounting the instrument onto a housing or the like for sensing a condition.

Various arrangements have been proposed for mounting the instrument movement upon the back plate. In one such arrangement the instrument movement is mounted directly upon a tubular member which in turn is inserted into the back plate and communicates through a passage system to an outside connection. While this arrangement is relatively simple and easy to assemble, certain difficulties are encountered in securely mounting the tube within the back plate and then in sealing the back plate connection to a housing.

One of the objects of the present invention is to provide an improved instrument casing assembly.

Another of the objects of the present invention is to provide for the mounting of an instrument movement upon a tubular member which passes directly through a component of the instrument casing to form a connection for the instrument.

In one aspect of the present invention, the instrument casing assembly may comprise a cover having a transparent end wall and a cylindrical side wall extending therefrom. A back plate is mounted within the outer end of the cylindrical wall and has a central bore therethrough. A metallic tubular socket is closely received within the bore and has a plurality of annular serrations or barbs for gripping the inner face of the bore. An instrument movement is mounted on one end of the socket within the cover and back plate and the other end of the socket projects outwardly of the back plate. A resilient O-ring is mounted on the projecting end of the socket to effect a sealing connection between the back plate, the projecting end of the socket and a housing, for example, a fire extinguisher body.

Other objects, advantages and features of the present invention will be apparent from the accompanying description and drawings, which are merely exemplary.

Figure 1:
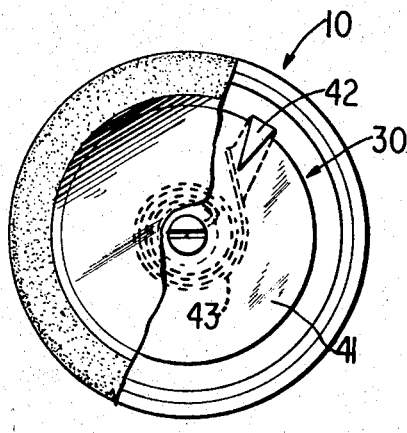
FIG. 1 is a front elevational view of an instrument caseing assembly of the present invention with a portion of the cover plate removed.

One embodiment or example of the invention will now be described. The instrument casing assembly of the present invention is indicated generally at 10 (FIGS. 1, 2) and comprises a cover 11 and a back plate 12. The cover 11 can be made of a clear plastic material such as butyrate, and can have a transparent end wall 13 and a cylindrical side wall 14 which may be finished so as to be translucent. At the outer end of side wall 14 there is formed an annular shoulder 15 and a raised annular rib 16.

The back plate 12 is formed of a plastic, such as polypropylene, and has an end wall 17, at the outer end of which is a flexible skirt 18 with an external rib 19. The shoulder 16 of the cover is received in an external groove 20 in the back plate formed by the skirt 18.

Figure 3:
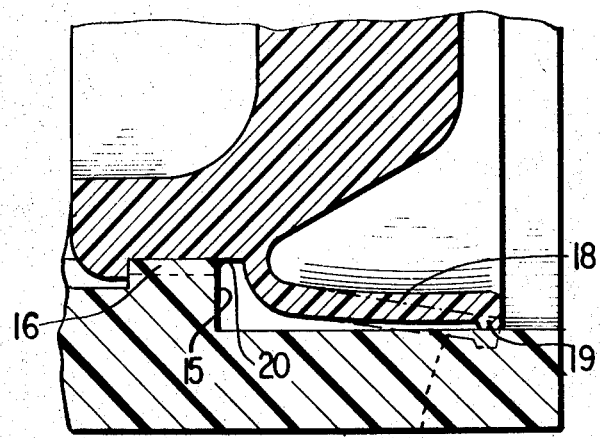
FIG. 3 is a portion of the view in FIG. 2 showing the mounting of the back plate within the cover and in enlarged scale.

During assembly, the back plate can be locked in position behind the shoulder as shown in FIG. 3. At the same time, skirt 18 is flexed from its normal unflexed position 22 into the position as shown in FIG. 3. Other types of closures and holding means can be used.

On the outer face of the back plate end wall 17 there extends a cylindrical boss 23 through which passes a central bore 24. An annular groove 25 is formed in the outer surface of boss 23.

Figure 2:
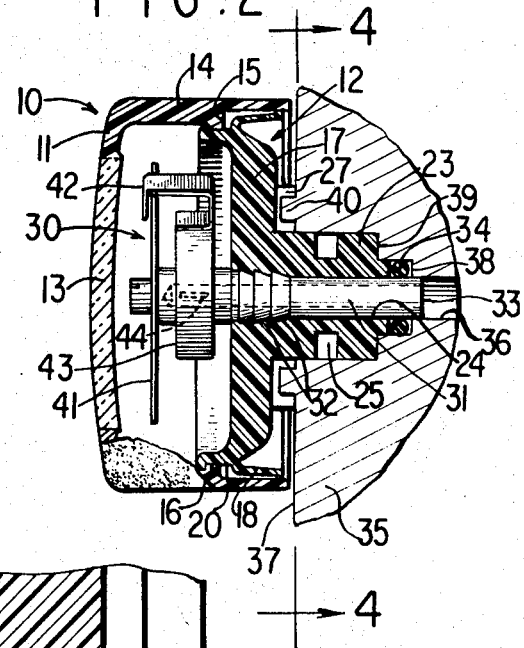
FIG. 2 is a longitudinal sectional view of the casing of FIG. 1.
Figure 4:
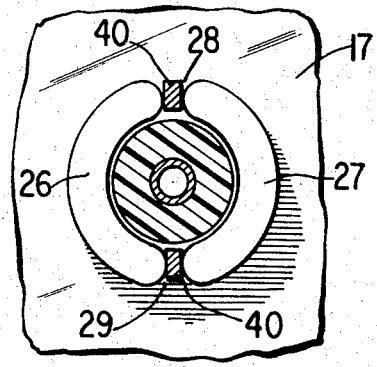
FIG. 4 is a sectional view taken along the line 4—4 of FIG. 2 and showing the outer face of the housing upon which the instrument casing assembly is mounted.

As may be seen in FIGS. 2 and 4, a pair of curved raised sections 26 and 27 are formed on the outer face of back plate end wall 17 and have their ends spaced apart to define slots 28 and 29.

An instrument movement indicated generally at 30 is mounted on one end of a tubular metallic socket 31 whose outer diameter is such as to fit closely within the central bore 24. The outer surface of the socket is provided with a plurality of annular serrations 32 which grip or engage the inner face of bore 24 to secure the socket tightly within the back plate. The outer end of the socket indicated at 33 extends outwardly of the boss 23 and is surrounded by a resilient O-ring 34 for effecting a sealing connection with a housing 35 such as shown in FIG. 2.

The housing 35 is provided with a bore 36 which closely receives the inner end 33 of socket 31. The outer end of housing bore 36 opening to a face 37 of the housing is stepped so as to form shoulders 38 and 39. The larger diameter portion of the bore closely receives cylindrical boss 23 (FIG. 2), the end of the boss terminating short of shoulder 38. Between the end of the boss and the shoulder 38 resilient O-ring 34 is positioned to effect a seal between housing bore 36 and the instrument assembly of the present invention.

The outer face 37 of the housing is provided with a pair of diametrically opposed lugs 40 which are received in the slots 28 and 29 to retain the instrument assembly against rotation when mounted in the housing.

The barbed or serrated connection between the tubular socket 31 and the central bore 24 of the instrument casing back plate results in the instrument movement being firmly held in position within the casing. The end 33 of the tubular socket extends into the housing bore 36 to be closely received therein and a sealing effect is achieved by the positioning of the rubber O-ring immediately outside of housing bore 36. The O-ring provides a tight seal between the interior of the housing and the exterior thereof. By employing a tight seal at this location the accuracy of the instrument movement is increased, particularly when the instrument is measuring the pressure of a fluid through housing bore 36.

The instrument movement is provided with a dial face 41 having a measuring scale thereon and a pointer 42 attached to a Bourdon tube means 43 which communicates with the interior of the tubular socket through a slot 44.

In the assembly of the instrument according to the present invention, the instrument movement and socket sub-assembly is mounted on the back plate by inserting the socket into the central bore of the back plate. The cover is then snapped over the back plate so that the internal rib 16 of the cover is received in the groove 20 of the cover plate. A resilient O-ring is then positioned over the projecting end of the tubular socket and the back plate boss inserted into the enlarged housing bore opening. The interaction between the metallic serrations of the tubular socket and the plastic back plate will provide a firm grip for the mounting of the instrument movement within the casing.

It will be understood that various details of construction and arrangement of parts may be made without departing from the spirit of the invention except as defined in the appended claims.

What is claimed is:

1. In a combined instrument casing and housing, the casing having a bore, a housing having a bore opening to a surface thereof, the housing bore opening at the end thereof adjacent said surface having a greater diameter than the casing bore and having a reduced diameter portion remote from said surface, a plastic instrument casing assembly including a plastic cover having a cylindrical side wall extending therefrom, a plastic back plate secured to said cover and having a tubular boss thereon and projecting rearwardly therefrom, the casing bore extending through the center of said boss and back plate, said boss having a diameter to fit closely within said housing bore opening, a metallic tubular socket closely received within and projecting from the opposing ends of said casing bore, annular serrations on said socket intermediate the ends thereof for gripping the inner face of said casing bore and clamping said socket therein, an instrument movement on the inner end of said socket in said casing, the outer end of said boss extending into said housing bore and terminating short of the reduced diameter portion of said housing bore opening, and resilient O-ring means surrounding said socket projecting outer end and between said boss end and the inner end of said housing bore opening for effecting a seal between said housing, socket and back plate.

2. In combination as claimed in claim 1, the cover having a transparent end wall and a cylindrical side wall extending therefrom, the back plate being mounted within said cylindrical side wall.

3. In combination as claimed in claim 1 and means on the outer face of said back plate for defining slot openings, and lugs on the outer face of said housing projecting into said slot openings.

References Cited

UNITED STATES PATENTS

| | | | |
|---|---|---|---|
| 1,994,784 | 3/1935 | Porzel | 285—239 |
| 2,059,813 | 11/1936 | Schellenger | 248—27 X |
| 2,536,860 | 1/1957 | Voigt | 248—27 |
| 3,080,758 | 3/1963 | Decker | 73—292 X |
| 3,152,480 | 10/1964 | Hoff | 73—431 |
| 3,250,292 | 5/1966 | Mollick | 73—411 X |
| 3,280,632 | 10/1966 | Harland et al. | |
| 3,293,917 | 12/1966 | Vanderheyden | 73—431 X |
| 3,434,330 | 3/1969 | Ingham et al. | 73—431 X |

LOUIS R. PRINCE, Primary Examiner

D. M. YASICH, Assistant Examiner

U.S. Cl. X.R.

73—420